(12) United States Patent
Yelton et al.

(10) Patent No.: US 7,148,861 B2
(45) Date of Patent: Dec. 12, 2006

(54) SYSTEMS AND METHODS FOR PROVIDING ENHANCED VISION IMAGING WITH DECREASED LATENCY

(75) Inventors: Dennis J. Yelton, Albuquerque, NM (US); Kenneth L. Bernier, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 472 days.

(21) Appl. No.: 10/377,412

(22) Filed: Mar. 1, 2003

(65) Prior Publication Data

US 2004/0169617 A1 Sep. 2, 2004

(51) Int. Cl.
*G09G 5/00* (2006.01)

(52) U.S. Cl. .................. 345/8; 345/418; 340/946
(58) Field of Classification Search ............ 345/156, 345/418–419, 425, 7–9; 340/946, 961
See application file for complete search history.

(56) References Cited

U.S. PATENT DOCUMENTS

| | | | |
|---|---|---|---|
| 4,805,015 A | | 2/1989 | Copeland |
| 4,947,350 A | * | 8/1990 | Murray et al. ............... 702/181 |
| 5,296,854 A | * | 3/1994 | Hamilton et al. ............ 340/980 |
| 5,317,394 A | | 5/1994 | Hale et al. |
| 5,325,472 A | | 6/1994 | Horiuchi et al. |
| 5,448,233 A | * | 9/1995 | Saban et al. ................. 340/963 |
| 5,495,576 A | | 2/1996 | Ritchey |

(Continued)

OTHER PUBLICATIONS

Jennings et al., "Synthetic Vision as an Integrated Element of an Enhanced Vision System," presented Apr. 1, 2002 at SPIE AeroSense Conference 2002 in Orlando, Florida.

(Continued)

*Primary Examiner*—Richard Hjerpe
*Assistant Examiner*—Kimnhung Nguyen
(74) *Attorney, Agent, or Firm*—Alston & Bird LLP

(57) ABSTRACT

The systems and methods of the present invention provide an image processor that displays enhanced vision images based on a plurality images sources. The image processor comprises both serial and parallel processors. The serial processor performs low data volume calculations needed by the parallel processor for image display. The serial processor precalculates transformations needed to convert source data from each source to a primary coordinate system. The parallel processor uses these transforms and correlates source data with the display on a pixel by pixel basis as each frame from the sources is received to thereby provide display data with decreased latency. The image processor reduces parallax effect and is capable of: 1) stitching images of different fields of view to provide a mosaic image; 2) fusing images taken of the same field of view by different types of sources into a fused image; and 3) correcting anomalies in the displayed image.

14 Claims, 16 Drawing Sheets

U.S. PATENT DOCUMENTS

| | | | |
|---|---|---|---|
| 5,812,257 A * | 9/1998 | Teitel et al. | 356/141.4 |
| 5,838,262 A * | 11/1998 | Kershner et al. | 340/945 |
| 5,904,729 A | 5/1999 | Ruzicka | |
| 6,195,455 B1 | 2/2001 | Mack et al. | |
| 6,411,266 B1 | 6/2002 | Maguire, Jr. | |
| 6,525,731 B1 | 2/2003 | Suits et al. | |
| 6,690,338 B1 | 2/2004 | Maguire, Jr. | |
| 6,791,540 B1 | 9/2004 | Baumberg | |
| 6,890,263 B1 | 5/2005 | Hiraoka et al. | |
| 2002/0044152 A1 | 4/2002 | Abbott, III et al. | |
| 2002/0080143 A1 | 6/2002 | Morgan et al. | |
| 2002/0149585 A1 | 10/2002 | Kacyra et al. | |
| 2003/0113006 A1 | 6/2003 | Berestov | |
| 2004/0021917 A1 | 2/2004 | Plesniak et al. | |
| 2004/0051711 A1 | 3/2004 | Dimsdale et al. | |
| 2004/0095999 A1 | 5/2004 | Piehl et al. | |
| 2004/0105573 A1 | 6/2004 | Neumann et al. | |
| 2004/0125103 A1 | 7/2004 | Kaufman et al. | |
| 2004/0247174 A1 | 12/2004 | Lyons et al. | |
| 2004/0257382 A1 | 12/2004 | van der Zijpp | |

OTHER PUBLICATIONS

Guell, Jeff; *"FLILO (Flying Infrared for Low-level Operations) an Enhanced Vision System,"* presented Apr. 2000 at SPIE AeroSense Conference 2000 in Orlando, Florida.

Liang et al., "Real-Time Texture Synthesis by Patch-Based Sampling," *ACM Transactions on Graphics,* vol. 20, No. 3, Jul. 2001, pp. 127-150.

Summers et al., "Calibration for Augmented Reality Experimental Testbeds," Symposium on Interactive 3D Graphics, 1999, Atlanta.

* cited by examiner

FPGA Algorithm

SYSTEMS AND METHODS FOR PROVIDING ENHANCED VISION IMAGING WITH DECREASED LATENCY

BACKGROUND OF THE INVENTION

1. Field of Invention

The present invention relates to vision display systems used to provide a user with a visual display of a field of interest, and more particularly to systems and methods that combine images from a plurality of sources to provide a coherent view of a field of interest.

2. Description of Related Art

Despite the advent of many flight navigational aids, one of the most important tools for navigation of aircraft remains visual navigation. Many of today's aircrafts include various safety features such as on board radar, ground proximity warning systems, etc. that provide a pilot with added information about the airspace surrounding the aircraft. These systems are a tremendous resource to aid the pilot in obtaining a better situational awareness during flight, by allowing the pilot to further interpret what he or she is visually observing. However, there are instances where these various instruments become the pilot's only resource of information because the pilot's vision is hindered.

Visual hindrances may be due to bad weather, such as fog, snow, or rain, or they may be due to the time of day, such as night, dawn, or dusk. Further, some visual hindrances are due to the field of view limitations of the aircraft itself. Many aircraft cockpits have a field of view that is typically limited to a forward facing area that does not provide the pilot with adequate visualization to the sides and rear of the aircraft and also does not provide adequate vertical visualization above and below the aircraft.

Obstructed vision is an important safety concern in aircraft navigation, and there has been considerable effort devoted to providing systems that increase or enhance a pilot's view from the cockpit. Systems have been developed that include the use of one or more sensors that are located on the aircraft. The sensors are directed toward a selected field of view and provide images to a display system in the cockpit, where they are, in turn, displayed to the pilot. The sensors may be video cameras, infrared cameras, radar, etc. The systems allow the pilot to choose the types of images to view. For example, in nighttime flight or fog conditions, the pilot may opt to view images from the infrared and radar sensors, while under clear conditions, the pilot may use video camera feeds.

These systems may also include synthetic image sources. Specifically, many systems include mapping databases that include synthetic illustrations of various geographic features. These mapping databases can be coordinated with the actual position of the aircraft so that the synthetic images may be displayed to give the pilot a synthetic visualization of the terrain within the range of the aircraft.

One example of an enhanced vision system is disclosed in U.S. Pat. No. 5,317,394 to Hale et al., which is incorporated herein by reference. In this system, sensors are positioned on the exterior of the aircraft such that adjacent sensors have overlapped fields of view. Images from these various sensors are provided to a display system in the aircraft, where they are displayed to the pilot. The images are displayed in an overlapped configuration so as to provide a composite or mosaic image.

A more advanced system is disclosed in U.S. patent application Ser. No. 09/608,234, entitled: Exterior Aircraft Vision System Using a Helmet-Mounted Display, which is incorporated herein by reference. The Ser. No. 09/608,234 application discloses a system that includes a helmet-mounted display for displaying images from various sensors located on the aircraft. Importantly, this system includes a helmet-tracking device that tracks movement of the pilot's head in order to determine the pilot's current line of sight (LOS) and field of view (FOV). Using this directional information, the system retrieves image data from the sensors that represent the field of view in which the pilot is staring and displays this image on the helmet display. The image is updated as the pilot turns his head to different lines of sight.

In general, these and other conventional systems provide fairly accurate visual images to the pilot, and thereby increase flight safety. However, there are some limitations to these systems that can cause the images provided to the pilot to either be less accurate or include anomalies that may distract the pilot's view. For example, one issue relates to the spacing of sensors relative to each other and relative to the pilot's position or in case of stored synthetic data, the difference in perspective between the synthetic data and the other sensors and pilot position. This physical distance between the sources relative to each other and to the cockpit may cause a skewing of the images provided to the pilot. Specifically, the distance creates a visual skewing in the images referred to as parallax. Parallax is an apparent change in the direction of an object caused by a change in observational position that provides a new line of sight. In these conventional systems, the sensor or sensors and/or synthetic data source each have a different line of sight with regard to a scene from that of the pilot. As such, when viewing the images from the sensor point of view or point of view of the synthetic data, the pilot is not provided with an accurate representation of the location of the object relative to his position in the aircraft in their overlapping fields of view. Also, the parallax effect between sensors and/or synthetic data can cause ghosting and other phenomena.

Another issue relates to tiling of several images together to create a composite image. In many conventional systems, images from adjacent cameras are displayed adjacent to each other. The edges of the two images appear as visual seams in the display. These seams disrupt viewing of the composite image and can make it harder for the pilot to view the image as a whole. To correct this problem some prior art systems overlap the edges of adjacent images in an attempt to blend the images together. While this technique is an improvement over the conventional technique of abutting adjacent images, there may still be perceived discontinuity between the images.

A further issue relates to the limitations of a particular type of sensor to provide the best imaging for a given situation. For example, in twilight conditions, a video camera will still provide a discernable visual image, but the image will be degraded in detail due to the low light or obstructed conditions. Further, an infrared sensor will provide imaging based on heat sensing, but the image from an infrared sensor will not have the benefit of the ambient light still available at twilight. In many conventional systems, the pilot must select between these images, instead having an image available that incorporates the advantages of both sensors. As such, the pilot does not have the best images available for viewing.

SUMMARY OF THE INVENTION

The present invention provides systems and methods for use in enhanced vision displays. The systems and methods of the present invention receive image data from a plurality of sensors located at different positions on a vehicle or in an area of interest. The system may also receive synthetic image data from a database, such as a terrain database. A sensor or a source of synthetic data are referred to herein as a source. The systems and methods assimilate the images from each source into a composite or mosaic image. The systems and methods of the present invention detect the current line of sight (LOS) of the user of the system. Based on this line of sight, the systems and methods display an image to the user representing the user's current field of view (FOV).

The systems and methods of the present invention reduce issues with regard to parallax in the displayed images. Specifically, the systems and methods of the present invention create one or more artificial mapping surfaces at a selected distance in front of the vehicle or point of interest. The artificial mapping surface allows the various images from the different sources to be correlated by a common frame of reference, with all of the images from each source being projected onto the mapping surface. The mapping surface creates a frame of reference for correlating the difference in line of sight to an object of interest between the observer and the source due to the distance separation between the observer and the source, as well as the distance between different sources.

Further, the sources and display have different coordinate systems. The systems and methods of the present invention create a common coordinate system and transform the images from each of these components to the common coordinate system. This, in turn, allows the systems and methods of the present invention to correlate the images from the various sources and provide them to the user in the viewer's frame of reference to thereby reduce and possibly eliminate parallax.

In addition to correcting for parallax, the systems and methods of the present invention also provide improved methods for stitching distributed aperture images together into a seamless mosaic. Specifically, where the field of view of two sources of the same type overlap, they will have pixels that also essentially overlap one another in the area of overlap of the sources. For pixels from different sources that overlap, the systems and methods of the present invention weight the pixels based on each pixel's respective location in the field of their respective source, with a pixel located nearer the center of the field of view of its respective source being weighted more than a pixel that is closer to the edge of the field of view of its respective source. The two overlapping pixels are then displayed based on this weighted percentage.

The systems and methods of the present invention also provide a method for overlaying or fusing images from different types of sensors. Specifically, the system of the present invention may include two different types of sensors having either the same or overlapped fields of view. The sensors provide different images of the same field of view; each sensor having associated advantages and disadvantages. For example, one sensor could be a video camera that provides images that may be affected by the amount of light or visibility and the other sensor may be an infrared sensor that provides images based on heat sensing. The systems and methods of the present invention provide a method for overlaying or fusing the images from these sensors together to provide an enhanced image.

For example, the systems and methods of the present invention may assign a percentage value to all pixels from one source and a different percentage value to all pixels from another source. The pixels for one source may be defined with a 30% intensity and the other a 70% intensity. The images are then summed together in this intensity percentage ratio, thereby providing the user with the benefit of both images. In the second alterative, each tile image is displayed based on its content. For example, given a visible and an infrared image covering similar fields of view, the images can be combined at pixel level, where priority can be given to the infrared image based upon its pixel intensity. In this case, if the infrared pixel is at 75% of maximum, then the resulting pixel would be composed from 75% of the IR pixel intensity and 25% visible pixel intensity.

The systems and methods of the present invention further include methods for reducing the number of anomalies in a given displayed image. The systems and methods of the present invention evaluate the intensity value associated with each pixel. If a pixel or a series of pixels have intensity values that are excessive compared to neighboring pixels, the systems and methods of the present invention may decrease their intensity based on an average intensity value from neighboring pixels.

BRIEF DESCRIPTION OF THE DRAWINGS

Figure 1A:
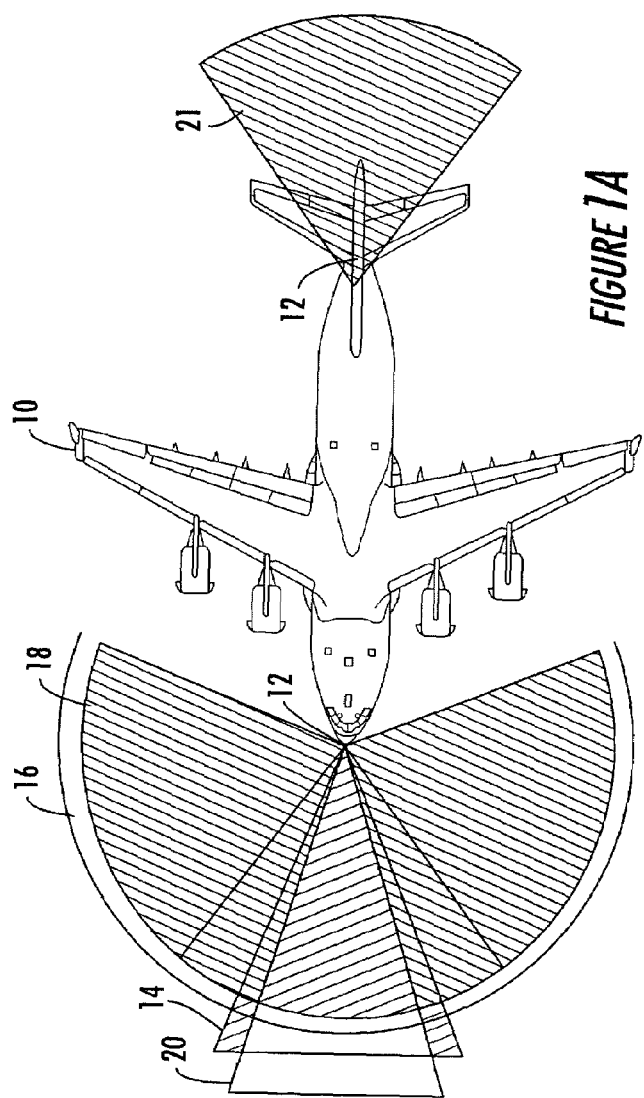
Figure 1B:
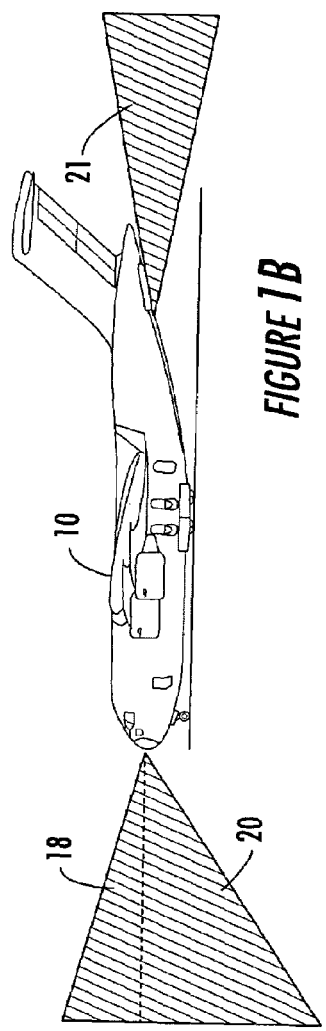

Having thus described the invention in general terms, reference will now be made to the accompanying drawings, which are not necessarily drawn to scale, and wherein:

FIGS. 1A and 1B illustrate top and side views of an aircraft within which the systems and methods of the present invention may be implemented.

Figure 2A:
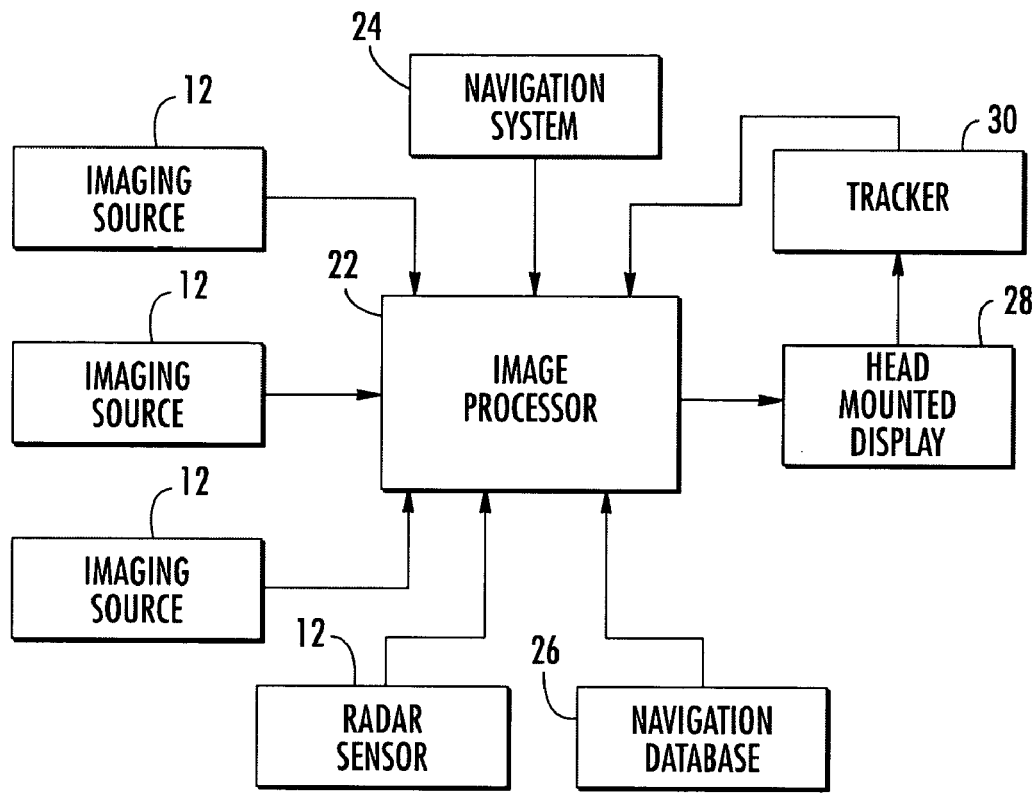

FIG. 2A is a block diagram of a system for providing enhanced vision according to one embodiment of the present invention.

Figure 2B:
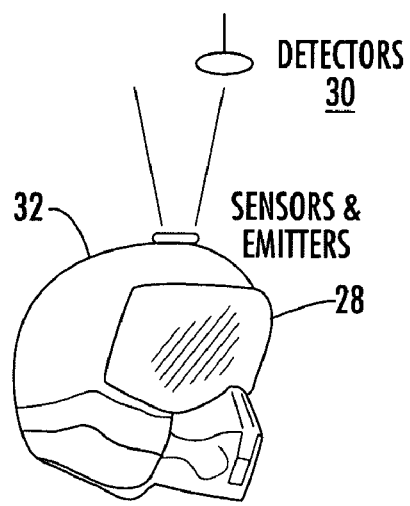

FIG. 2B is an illustration of a head mounted display with a helmet tracking system for use with the present invention.

Figure 3:
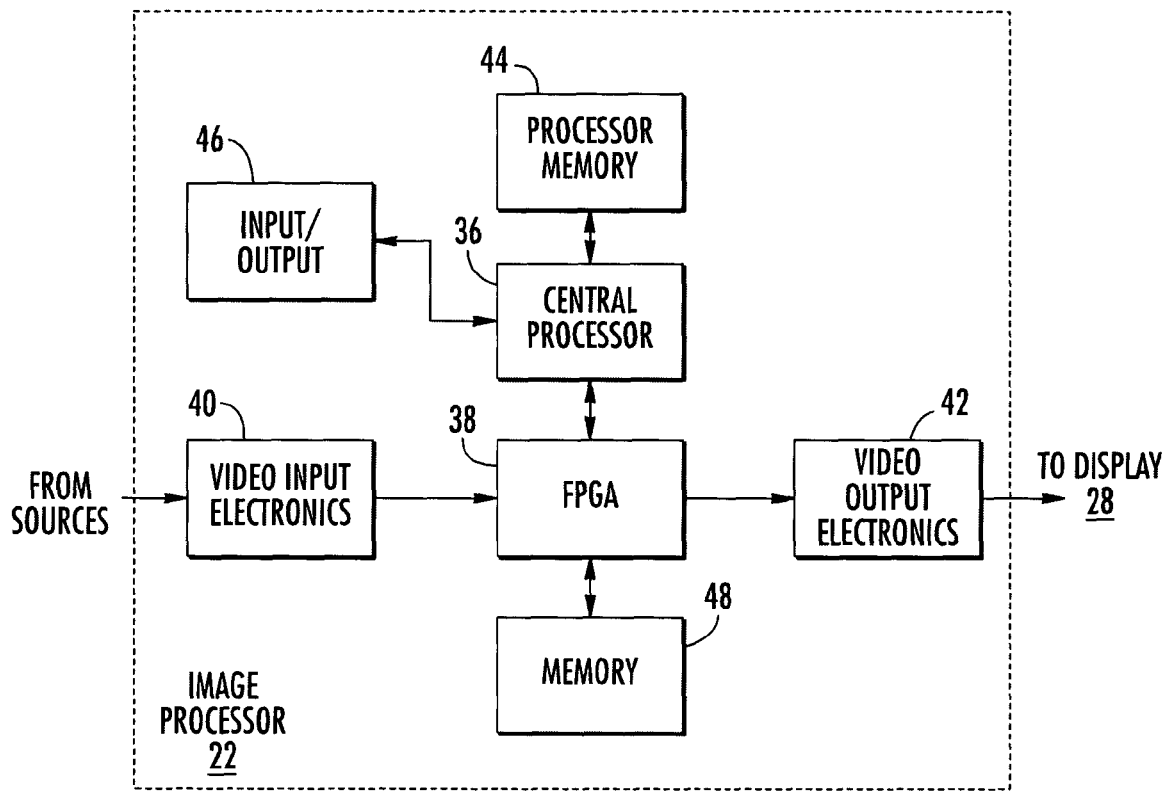

FIG. 3 is a block diagram of the image processor used to provide enhanced vision according to one embodiment of the present invention.

FIGS. 4A–4D are diagrams illustrating different placement of the mapping surface and associated problems therewith.

Figure 5:
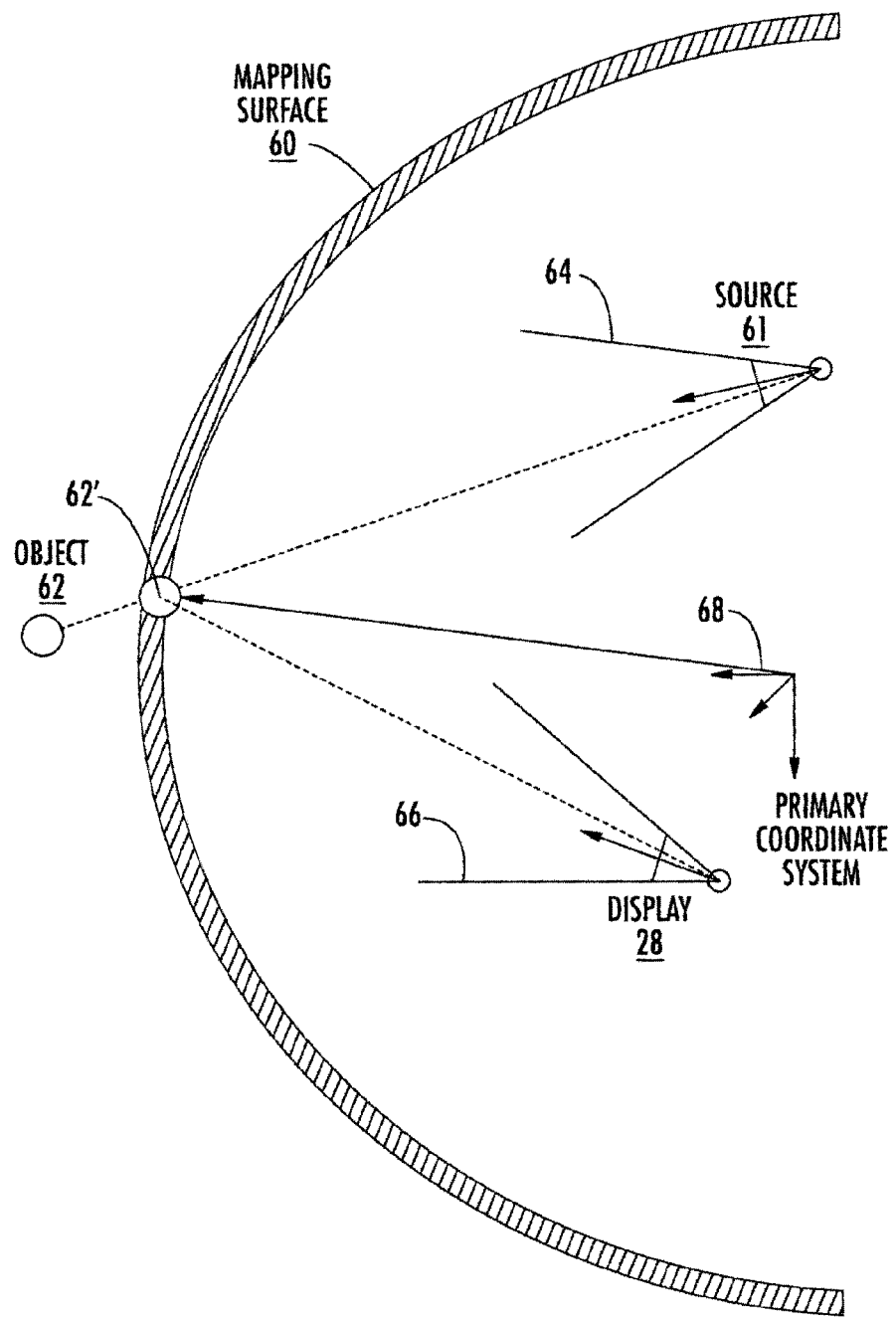

FIG. 5 is a diagram illustrating the different coordinate systems for the sensors, display, and mapping surface used in the present invention.

Figure 6:
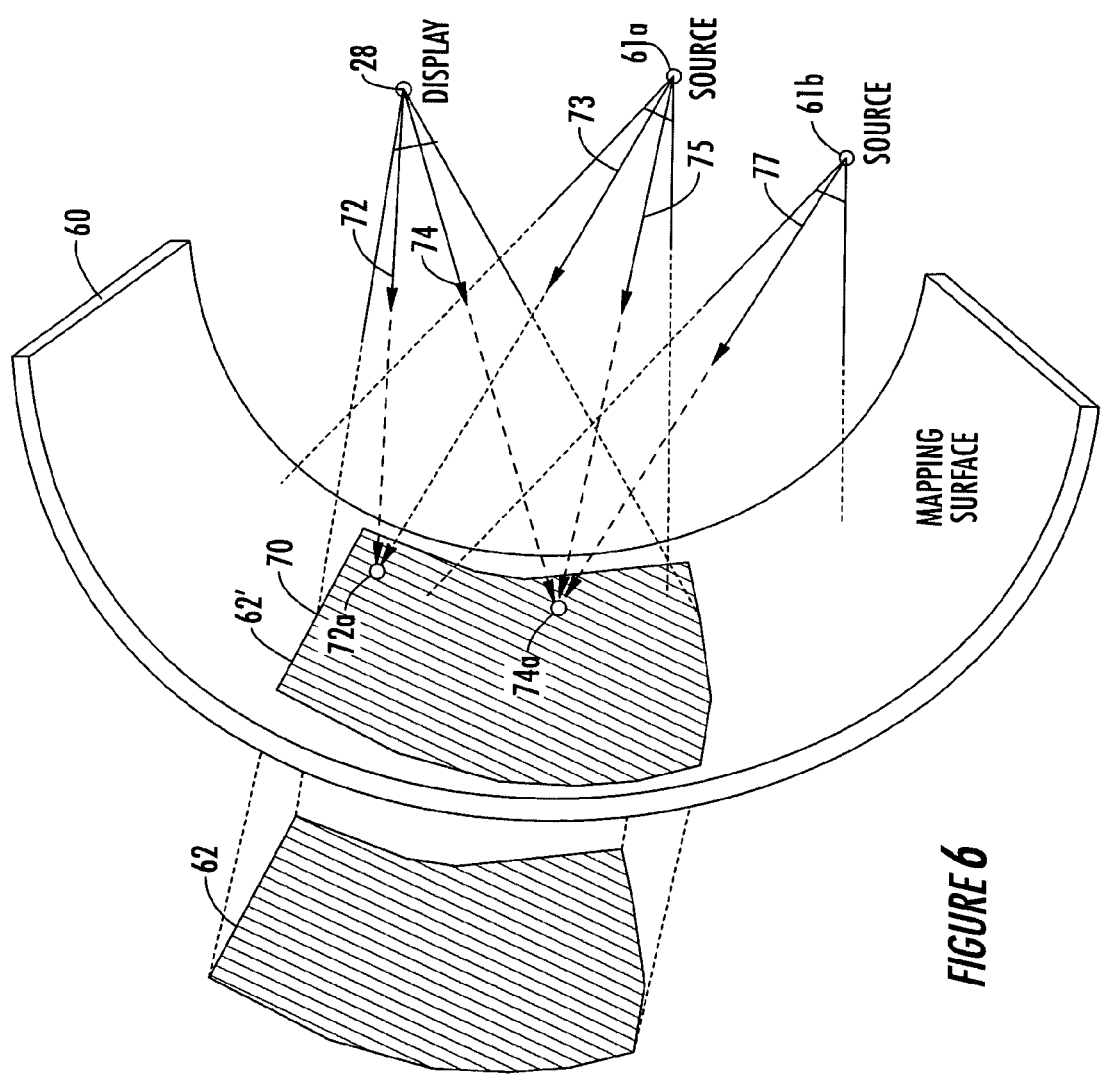

FIG. 6 is a diagram illustrating the correlation of display pixels with corresponding source pixels.

Figure 7:
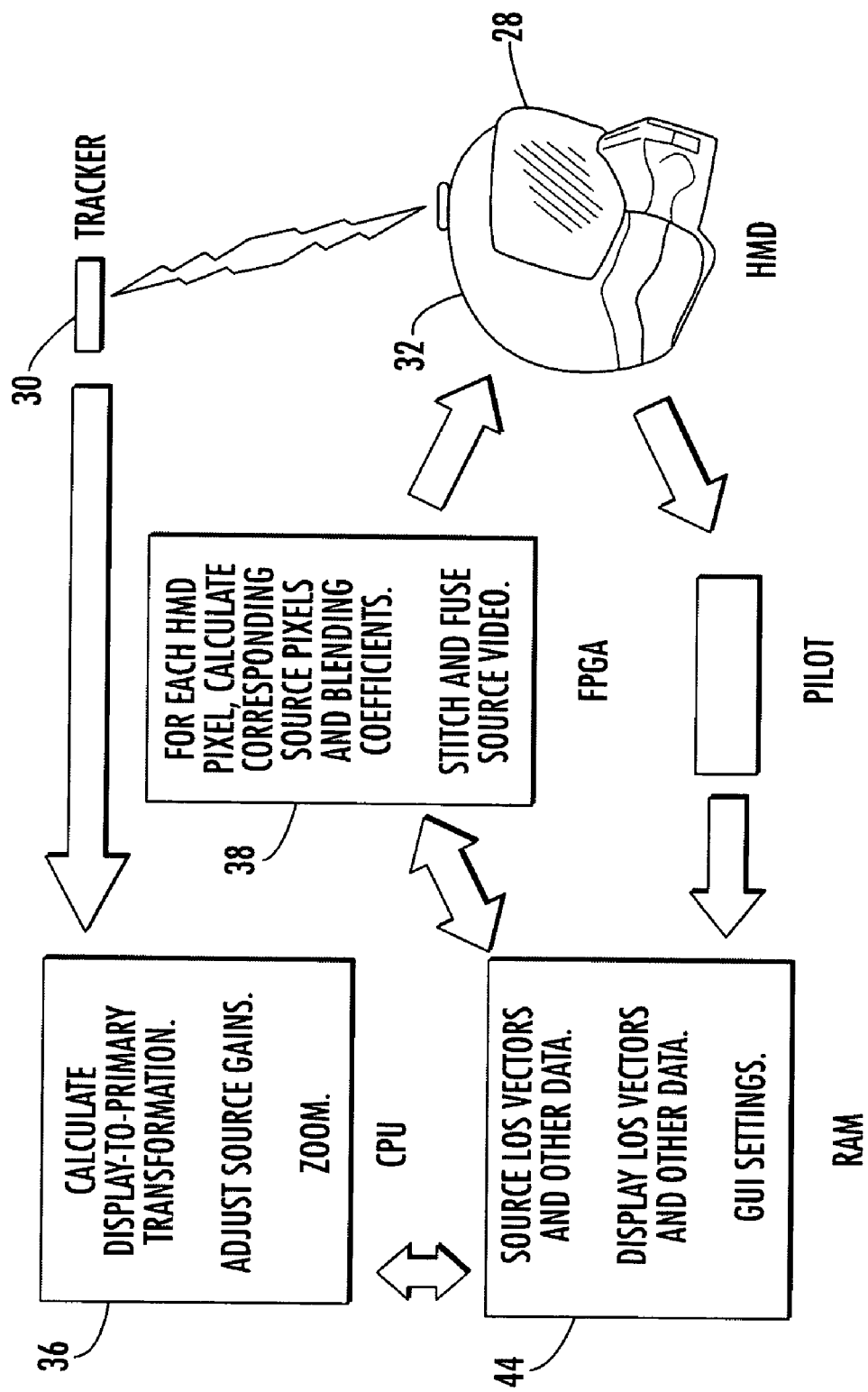

FIG. 7 is a block diagram illustrating the flow of information between different components of the image processor according to one embodiment of the present invention.

Figure 8:
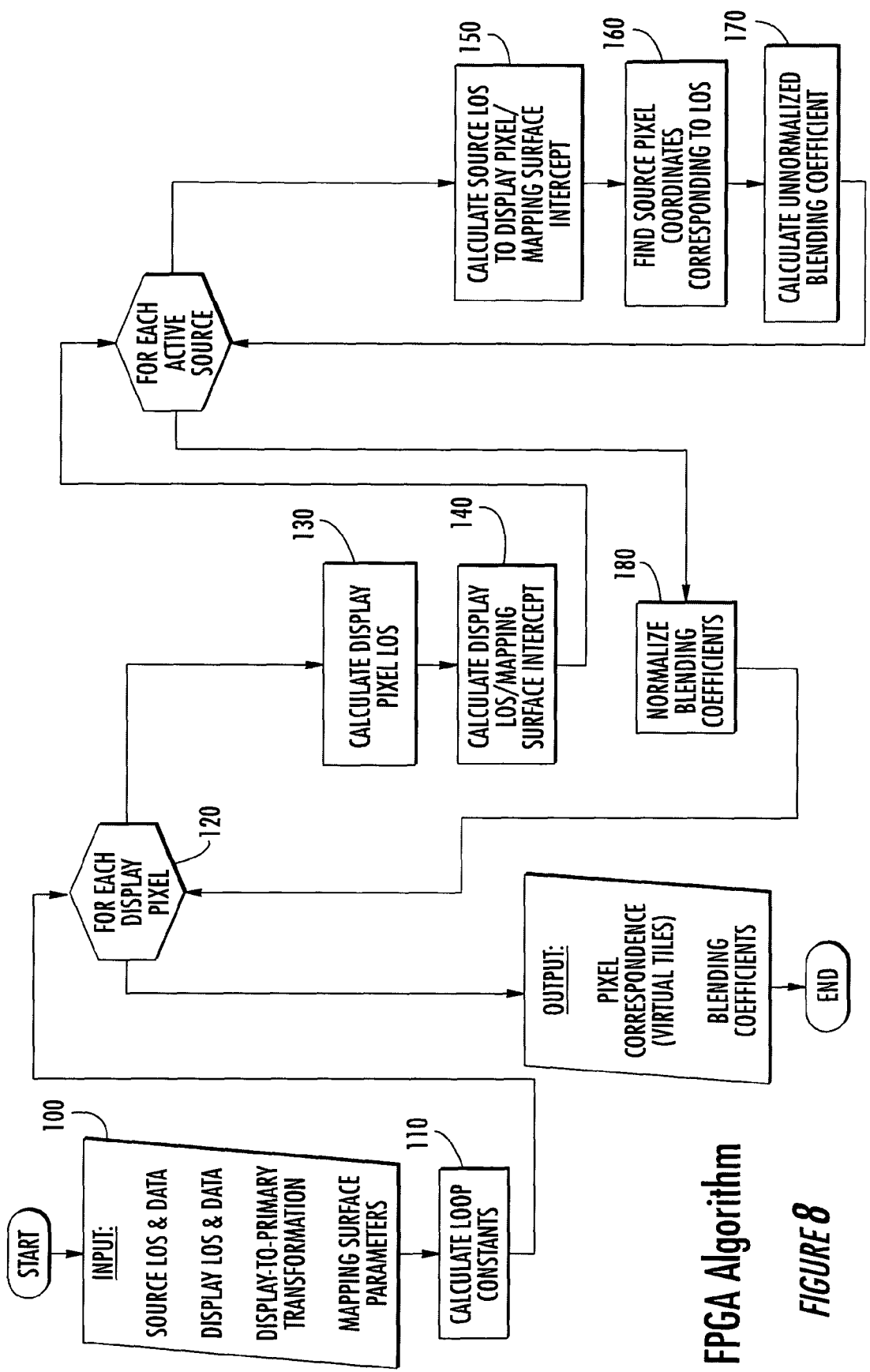

FIG. 8 is a block diagram of the operations performed to provide an enhanced vision system according to one embodiment of the present invention.

Figure 9:
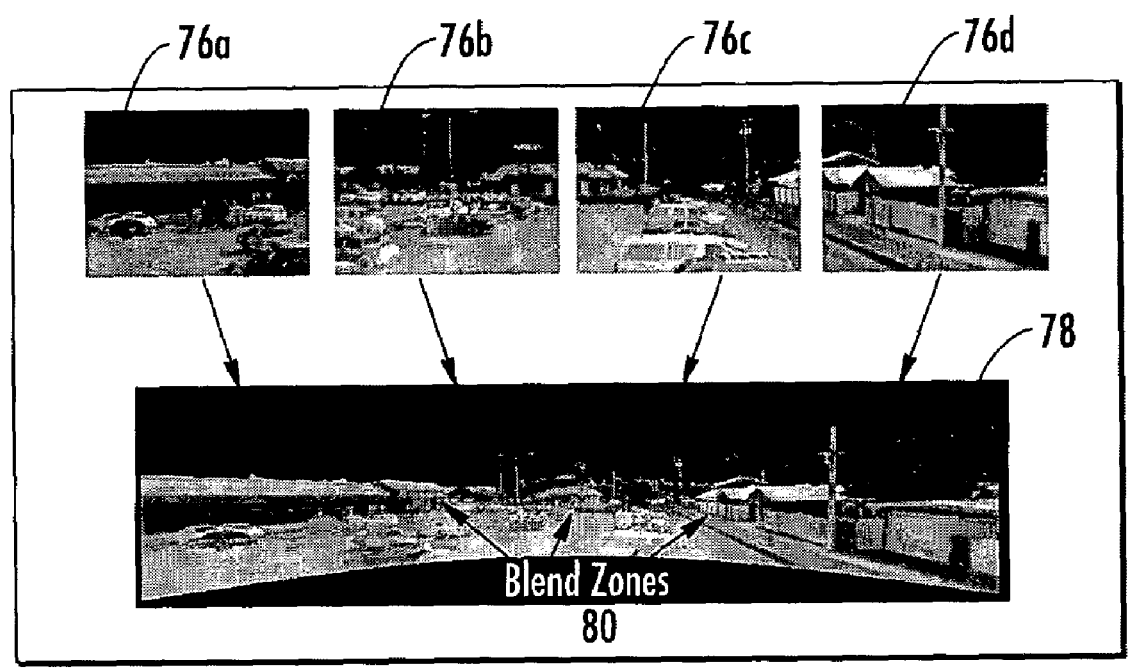

FIG. 9 is a diagram illustrating stitching of adjacent tiles to form a composite or mosaic image.

Figure 10:
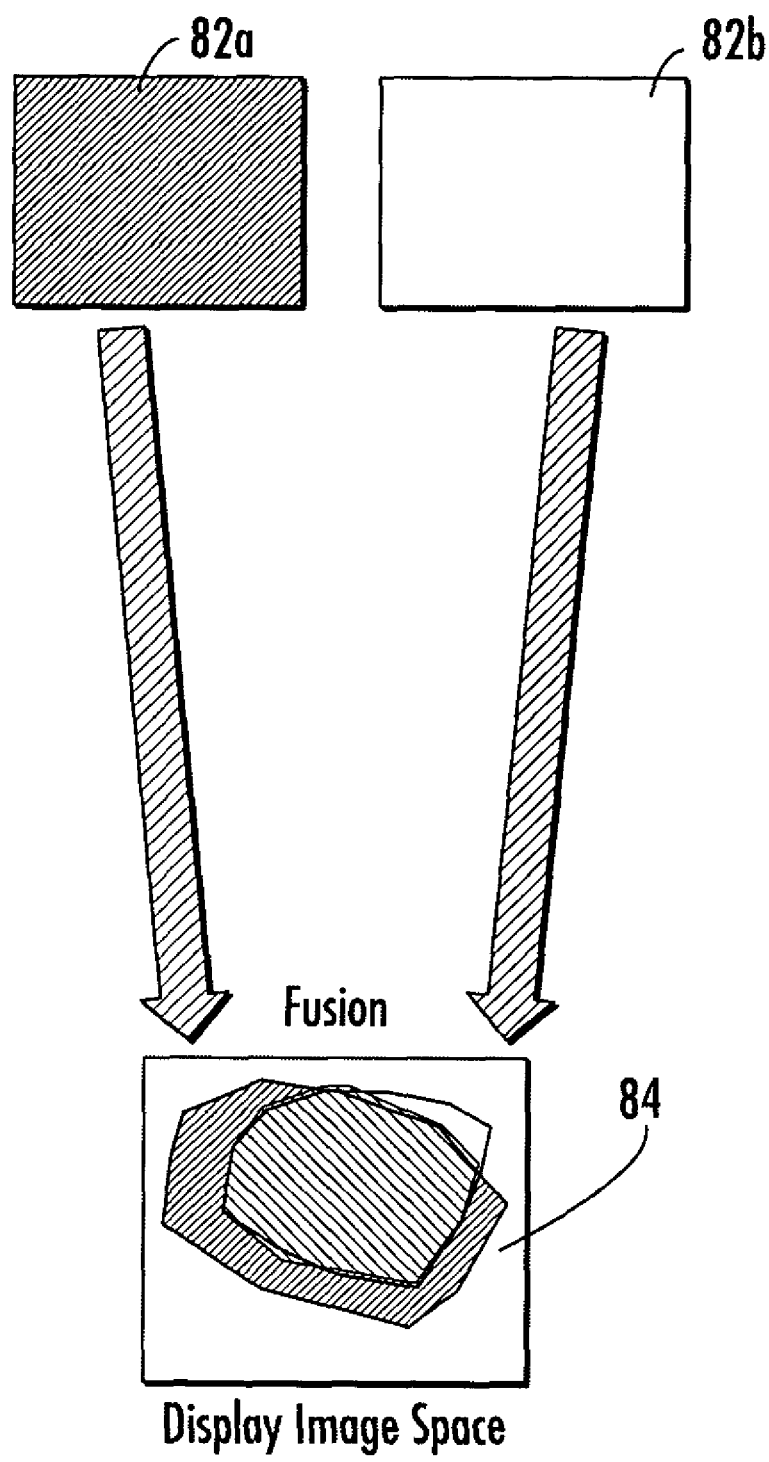

FIG. 10 is a diagram illustrating fusing two images together to form a composite image.

Figure 11:
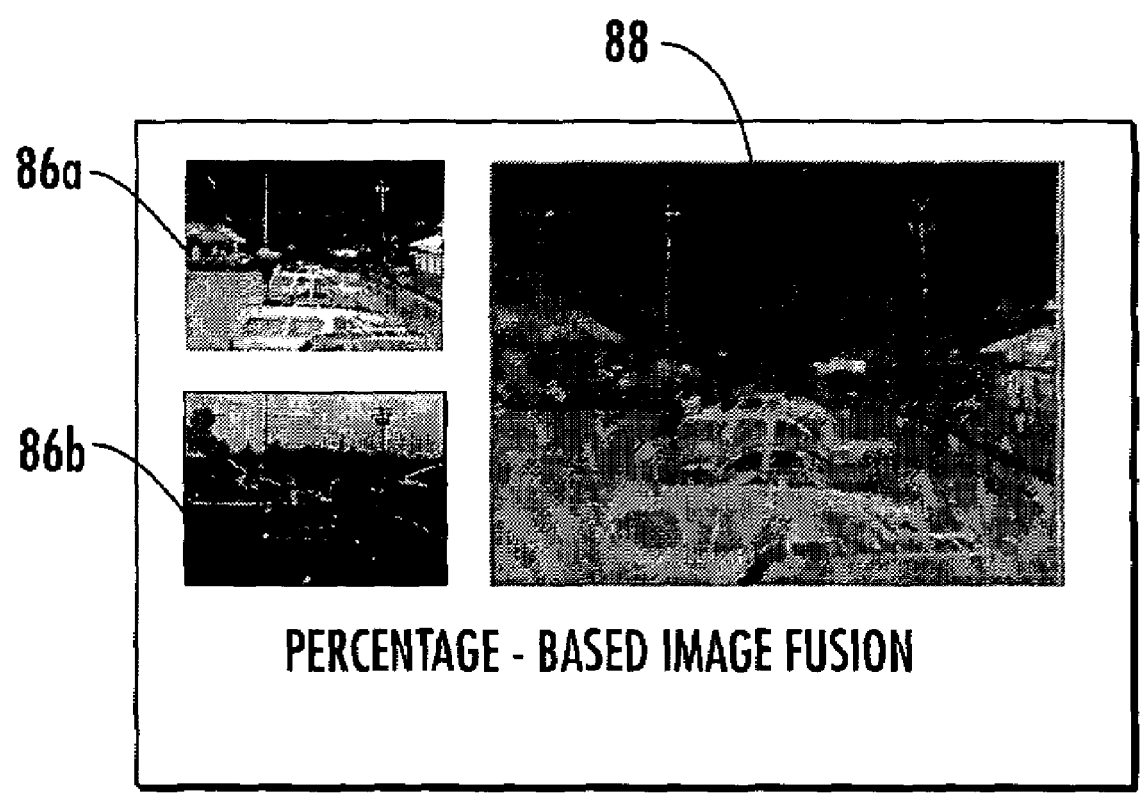

FIG. 11 is a diagram illustrating the results of percentage-based fusing of two images to form a composite image.

Figure 12:
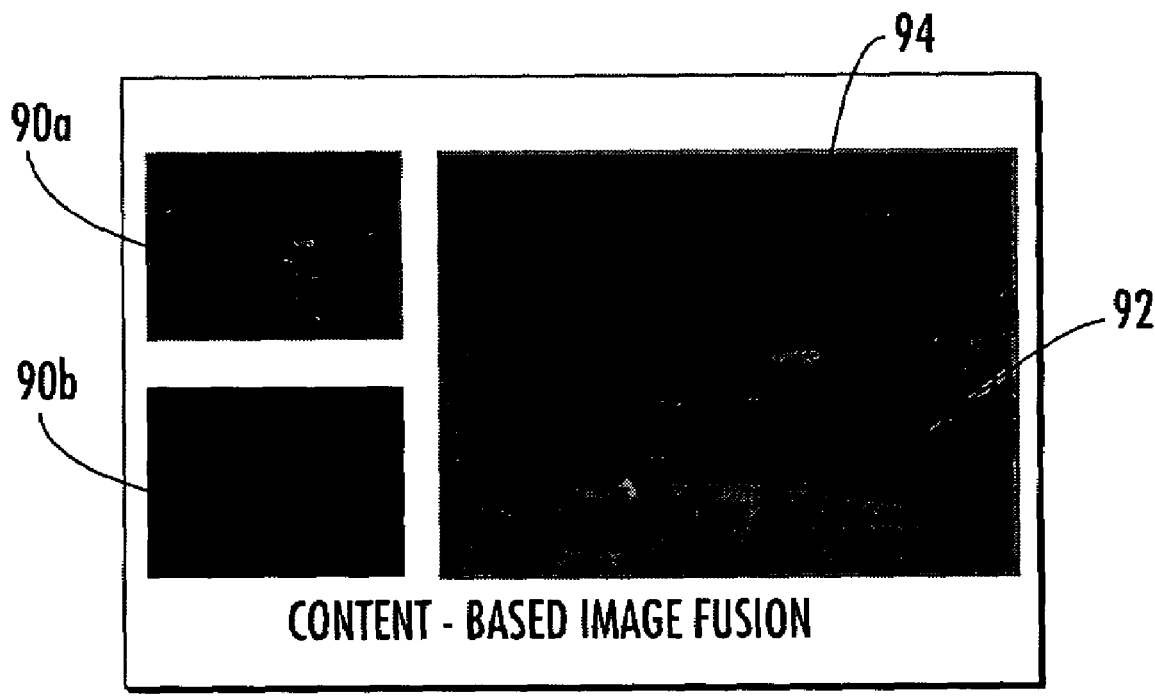

FIG. 12 is a diagram illustrating the results of content-based fusing of two images to form a composite image.

Figure 13:
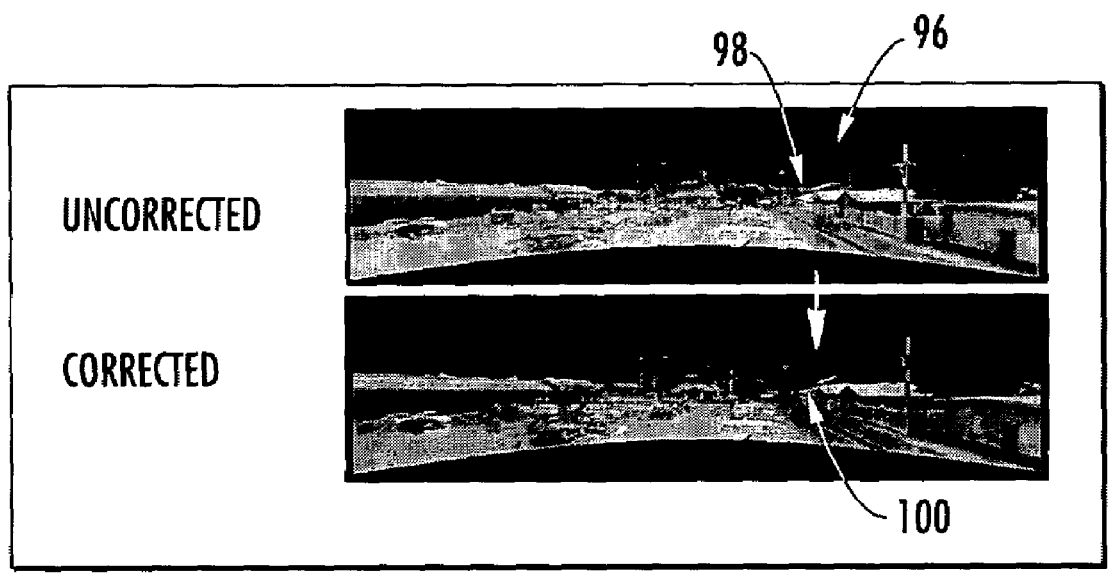

FIG. 13 is a diagram illustrating correction of anomalies at the junction between adjacent images.

Figure 14:
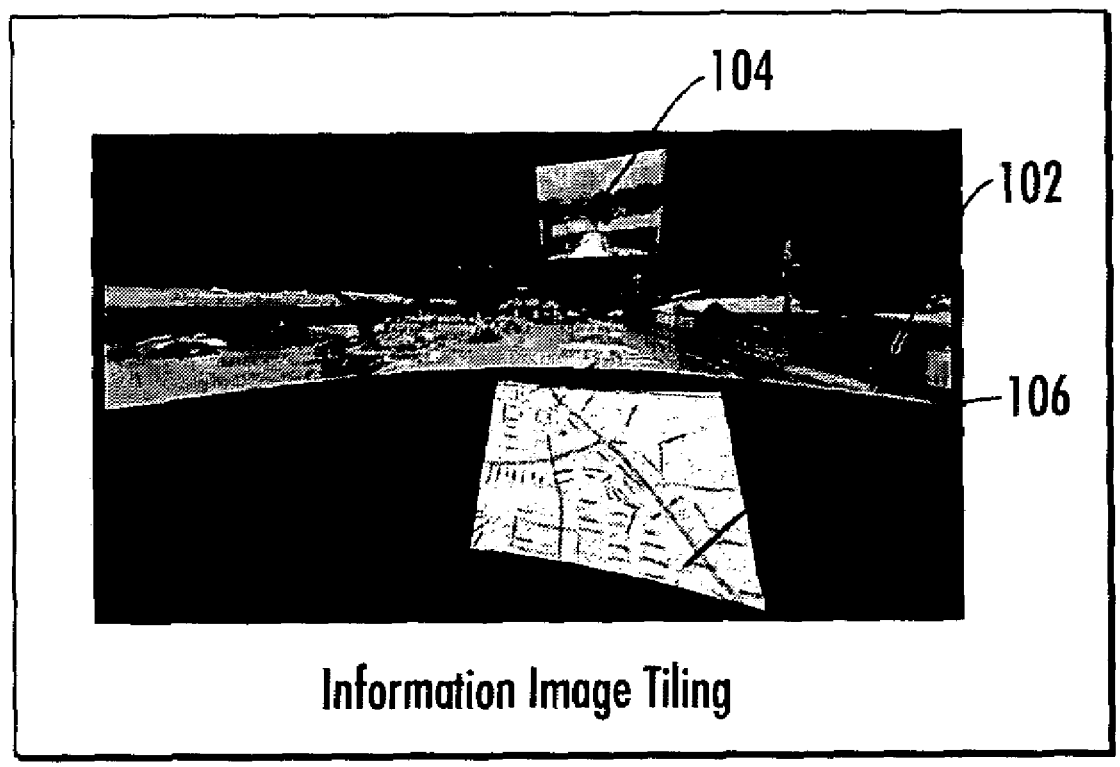

FIG. 14 is a diagram illustrating tiling of different images within the display.

Figure 15:

FIG. 15 is a diagram illustrating fusion of an infrared image with a synthetic database image.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention provides systems and methods for use in enhanced vision displays. The systems and methods of the present invention receive image data from a plurality of sensors located at different positions on a vehicle or in an area of interest. The system may also be provided with synthetic data. A sensor or a source of synthetic data is referred to herein as a source. The systems and methods assimilate the images from each source into a composite image. The systems and methods of the present invention detect the current line of sight (LOS) of the user of the system. Based on this line of sight, the systems and methods display an image to the user representing the user's current field of view (FOV).

The systems and methods of the present invention reduce issues with regard to parallax in the displayed images. Specifically, the systems and methods of the present invention create one or more artificial mapping surfaces at a selected distance in front of the vehicle or point of interest. This artificial mapping surface allows the various images from the different sources to be correlated by a common frame of reference, with all of the images from each source being projected onto the mapping surface. The mapping surface creates a frame of reference for correlating the difference in line of sight to an object of interest between the observer and the source due to the distance separation between the observer and the source, as well as the distance between different sources.

Further, the sources and display have different coordinate systems. The systems and methods of the present invention create a common coordinate system and transform the images from each of these components to the common coordinate system. This, in turn, allows the systems and methods of the present invention to correlate the images from the various sources and provide them to the user in the viewer's frame of reference to thereby reduce and possibly eliminate parallax.

In addition to correcting for parallax, the systems and methods of the present invention also provide improved methods for stitching various tile images together into a composite image. Specifically, where the field of view of two sources of the same type overlap, they will have pixels that also essentially overlap one another in the area of overlap of the sources. For pixels from different sources that overlap, the systems and methods of the present invention weight the pixels based on each pixel's respective location in the field of their respective source, with a pixel located nearer the center of the field of view of its respective source being weighted more than a pixel that is closer to the edge of the field of view of its respective source. The two overlapping pixels are then displayed based on this weighted percentage.

The systems and methods of the present invention also provide a method for overlaying or fusing images from different types of sensors. Specifically, the system of the present invention may include two different types of sensors having either the same or overlapped fields of view. The sensors provide different images of the same field of view; each sensor having associated advantages and disadvantages. For example, one sensor could be a video camera that provides images that may be affected by the amount of light or visibility and the other sensor may be an infrared sensor that provides images based on heat sensing. The systems and methods of the present invention provide a method for overlaying or fusing the images from these sensors together to provide an enhanced image.

For example, the systems and methods of the present invention may assign a percentage value to all pixels from one source and a different percentage value to all pixels from another source. The pixels for one source may be defined with a 30% intensity and the other a 70% intensity. The images are then summed together in this intensity percentage ratio, thereby providing the user with the benefit of both images. In the second alterative, each tile image is displayed based on its content. For example, given a visible and an infrared image covering similar fields of view, the images can be combined at pixel level, where priority can be given to the infrared image based upon its pixel intensity. In this case, if the infrared pixel is at 75% of maximum, then the resulting pixel would be composed from 75% of the IR pixel intensity and 25% visible pixel intensity.

The systems and methods of the present invention further include methods for reducing the number of anomalies in a given displayed image. The systems and methods of the present invention evaluate the intensity values associated with local areas in adjacent images. The systems and methods of the present invention provide the means for local brightness discontinuity correction for adjacent as well as similar field of view images.

As summarized above, the systems and methods of the present invention provide an enhanced vision system. The various aspects of the present invention are provided in greater detail below.

It is first important to note, that the systems and methods of the present invention can be used in any environment where visual situational awareness is a concern, be it in an aircraft, automobile, or other type of vehicle or in a specified location or environment, such as a secured or surveillance area. In the below embodiments, the systems and methods are disclosed with regard to an aircraft. The aviation environment is a dynamic environment and aids in illustrating the robustness of the system. It is understood, however, that this is only one example of the use of the system and methods and that a wide variety of other applications are envisioned for use of the invention.

FIGS. 1A and 1B illustrate an aircraft 10 in which the systems and methods of the present invention may be incorporated. In this embodiment, the system of the present invention may include a plurality of sensors 12 located at various positions on the aircraft. Sensors are located at the front of the aircraft in different orientations to provide various forward 14, side 16, upward 18, and downward views 20. Further, in some embodiments, sensors may be located in the rear of the aircraft for rear views 21. While not illustrated, various sensors may also be located on the wings, top, and bottom sides of the aircraft. Typical sensors used with the system are low-light level video cameras, long-wave infrared sensors, and millimeter wave radar, to name a few.

As illustrated in FIG. 2A, the various sensors 12 are electrically connected to an image processor 22 located on the aircraft. The image processor of the present invention is responsible for assimilating the various images from the sensors for display. Also connected to the image processor is a navigation system 24 for providing positional information, (i.e., longitude, latitude, pitch, roll, yaw, etc.), related to the aircraft. A navigational database 26 may also be available for providing synthetic navigational data to the system. Synthetic navigational data is typically 3D graphic data that simulates the terrain of other points of interest in a geographic location.

The systems and methods of the present invention are capable of accepting either data from the sensors or synthetic graphics data from the navigation database. The data from the sensors and the navigation database are handled the same by the image processor. In light of this, in the below discussion, the term source is used to mean either sensors or the navigational database.

Also connected to the image processor is a display 28. In this particular embodiment, the display is a helmet-mounted display located in the helmet of the pilot or other viewer. Associated with the helmet is a helmet tracking device 30. The helmet-tracking device provides information to the image processor concerning the present line of sight of the user relative to the vehicle. As illustrated in FIG. 2B, a series of sensors or reflectors are located at various positions on the helmet 32 worn by the user. The tracking device 30 is located at a known position relative to the helmet and tracks the movement an orientation of the sensor to determine the line of sight of the user relative to the vehicle. Such tracking devices are available from military suppliers such as BAE Systems in Santa Monica, Calif., or commercial suppliers such as Ascension Technology Corporation located in Milton, Vt., as well as several other suppliers not mentioned here. It is understood here that a helmet-tracking device is not required for the invention. Instead of use such a device, the orientation of the vehicle itself or a joystick control, etc., could be used to determine the user's line of sight. Similarly, in a security or surveillance location environment, the line of sight could be a fixed value trained on the view of interest.

FIG. 3 provides a detailed operational diagram of the image processor 22. The image processor includes a serial-based central processor 36, and a parallel processing device such as field programmable gate array (FPGA) 38. The FPGA include video input electronics 40 connected to the various sources and a video output electronics 42 connected to the display. Associated with the central processor is an input/output interface 46 for receiving inputs from the helmet-tracking device 30, navigation system 24, navigation database 26, as well as various pilot input commands. The FPGA includes a separate memory device 48.

As illustrated, the image processor 22 of one embodiment of the present invention includes both a central processor 36 and an FPGA 38. The success of the present invention is the careful partitioning of the computational workload between a parallel processing device such as a FPGA and a serial-based central processor. Rate-limiting calculations are allocated to the FPGA, and all other calculations are allocated to the central processor. This workload allocation allows the systems and methods of the present invention to operate with decreased latency. Specifically, many of the calculations required for display of images from the various sources can be precalculated by the central processor and stored at initialization. The processing of image data from the sources and correlating this data with a display can be handled efficiently by a parallel processing device such as an FPGA. The FPGA can process image data as it is received on a pixel-by-pixel basis, thereby decreasing the latency of the system to one frame. Specifically, this allocation between the two types of processing elements allows the systems and methods of the present invention to operate with a latency of one image frame.

It is understood that any type of serial based processing element can be used for the functions of the central processor described herein. Further it is understood that any type of parallel processing element can be used to perform the functions described herein relating to the FPGA and that an FPGA is only used herein as an example.

With regard to workload allocation, one allocation is with regard to coordinate transformations. As is discussed later below with reference to FIG. 5, the present invention uses three basic coordinate systems:

1. The primary coordinate system which is a fixed coordinate system, typically corresponding to the coordinate system of the aircraft or vehicle or facility;
2. Source coordinate systems—separate coordinate systems fixed with respect to each source; and
3. Display coordinate systems—separate coordinate systems fixed with respect to the displays.

The importance of these particular coordinate systems is that the bulk of the intermediate values used in the image stitching and fusing computations are constant in at least one of these coordinate systems. A coordinate system where a data element is constant is called the "proper" coordinate system for that data element. Thus, any value only need be calculated exactly one time in its proper coordinate system. Transient transformations from coordinate system to coordinate system are still required, but these reduce to simple multiply-accumulate operations in which FPGA technology excels. The strategy is to calculate intermediate values in their proper coordinate system, which generally only need to be done one time, and then use the FPGA for transitioning data between coordinate systems and other related calculations.

In the systems and methods of the present invention in order to provide coherent perspective-correct displays, each source image is mapped into the desired display image space based upon relative geometry. Specifically, each pixel of the display is processed separately without reference to the other display pixels. For each display pixel, it is determined what pixels of the sources correspond to the display pixel by mapping the pixels of the display and sources into a common or primary coordinate system. Each pixel of the displays and the sources has a line of sight vector protruding from the source to a common mapping surface. Those source line of sight vectors that intersect the mapping surface at or near the same location as a display line of sight vector correspond to the display line of sight vector, and therefore the data associated with those line of sight vectors of the sources are used as the data to be displayed at the pixel location in the display corresponding to the display line of sight vector.

The intermediate values that most significantly impact computational performance are the line of sight vectors corresponding to the display and source pixels. These are constant in their respective proper coordinate systems. For example, a given pixel in a display corresponds to a line of sight that is fixed relative to the helmet. What is important for the tiling/stitching/fusing task (discussed in detail below) is not the shape of the helmet display but, rather, this line of sight for each pixel of the display that is in a coordinate system fixed relative to the helmet. This information uniquely determines "where each pixel of the display is looking." This line of sight does not change relative to the helmet, so it never needs to be recalculated once it is known. Of course, in other coordinate systems it does change with the head movement of the crewmember wearing the helmet and display, but this is simply a matter of performing the necessary coordinate transformation using the FPGA. Likewise, the line of sight for each source is also fixed relative to its coordinate system and thus each line of sight vector for each source can also be precalculated. By precalculating the line of sight vectors for each pixel of each display and source ahead of time, the FPGA need only concern itself with transforming these vectors between the different coordinate systems and related calculations to determine which line of sight vectors intersect the mapping source at the same location.

As mentioned, a major issue with vision systems is the phenomenon of parallax, which is caused by the physical separation between the sensors themselves, and between the sensors and the viewer. This may also be caused by the difference in perspective of synthetic data and the viewer. This separation causes the sources to have a different perspective relative to an object from that of the position of the user. To remedy these issues, the systems and methods of the present invention provide two procedures that reduce, if not eliminate issues with parallax. Specifically, the systems and methods of the present invention first define geometric mapping space that allows the images from the various sensors to be mapped to a common space. Secondly, the systems and methods of the present invention create a primary reference coordinate system and transform the source and display to the primary coordinate system.

With regard to the geometric mapping surface, the systems and methods of the present invention approximate the geometry of the real-world environment being imaged by the sensors with one or more continuous mapping surfaces. As discussed further below, each pixel of the display is mapped to the location on the mapping surface where the pixel's line of sight intersects the mapping surface. It is then determined which sources have a pixel that has a line of sight that maps at or near to the same place as where the line of sight of the display pixel intersects. The source pixel is transformed and displayed. In this manner, each pixel of the display and sources are transformed to a common primary coordinate system for viewing.

With reference to FIGS. 4A–4D, a geometric mapping surface is selected as a common outer boundary for the display and sources. The mapping surface is used to correlate the pixels of the display with corresponding source pixels. The selection of the position of the geometric surface relative to the position of the sensors is critical to reducing the issues with parallax. An object in the field of view of two sources will be seen twice in a stitched image if the estimated range to the image is incorrect. This is the phenomenon of "ghosting." The only way to completely overcome this problem is with accurate knowledge of the range for each pixel in the overlap regions of the sensors. However, this algorithm achieves good results with a simpler compromise solution. The imagery is mapped onto some simple geometrical surface that roughly approximates the ranges, such as a sphere and/or plane. The surface parameters can be chosen manually when necessary, or automatically using some heuristic algorithm based on instrument inputs. Accurate choices minimize the effects of ghosting and transposition.

Figure 4A:
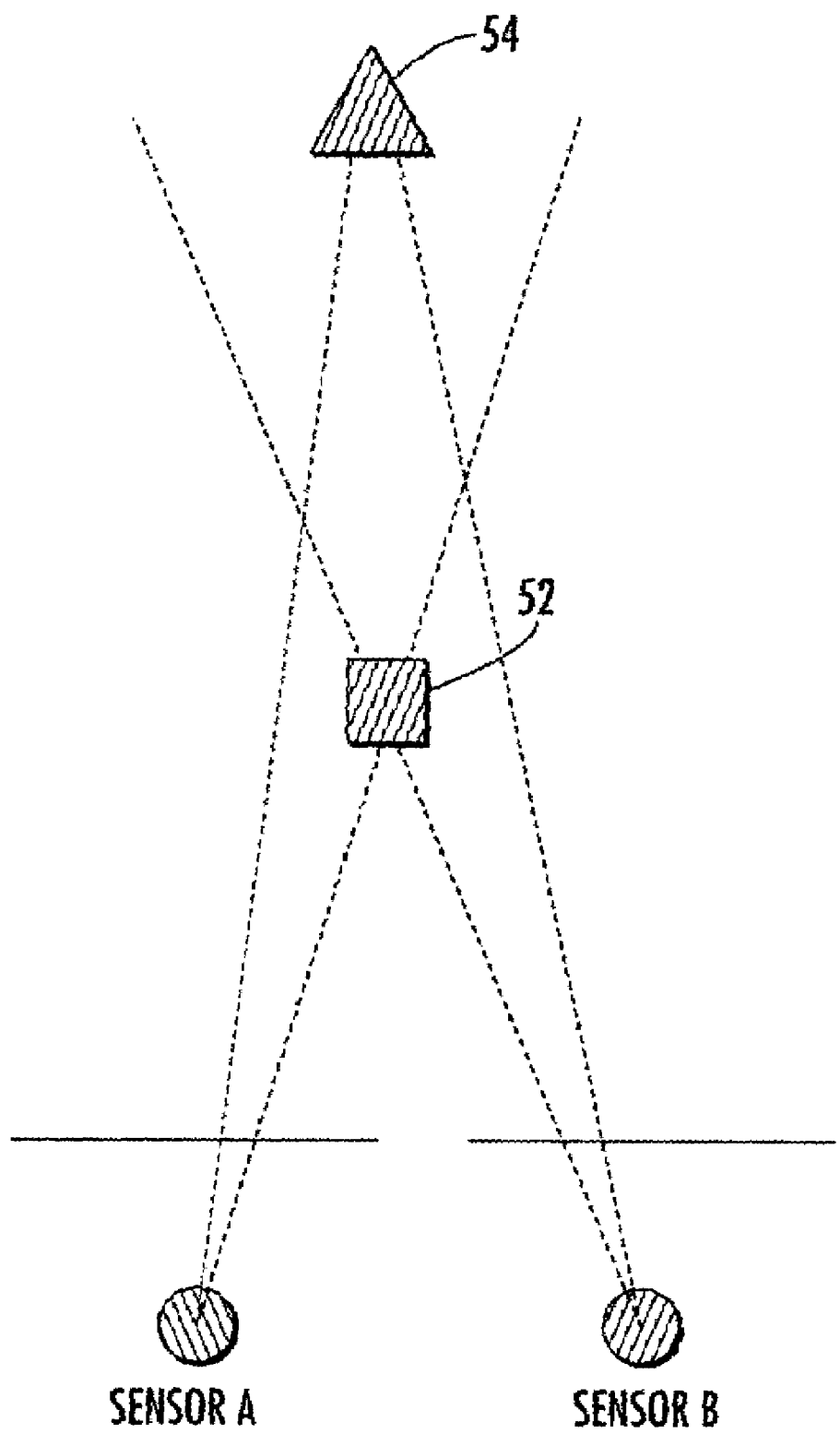
Figure 4B:
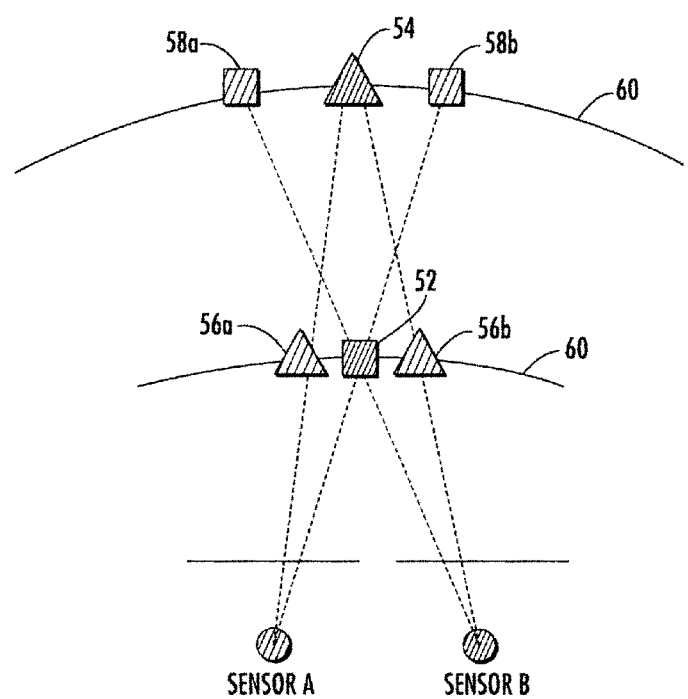
Figure 4C:
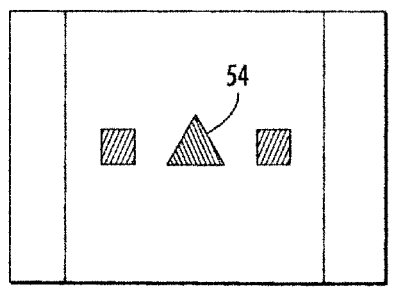
Figure 4D:
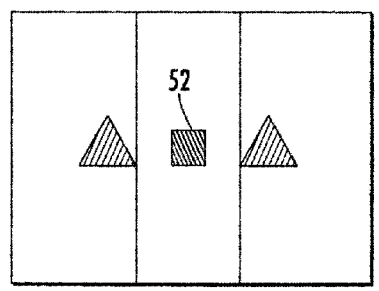

FIG. 4A illustrates the issues related to selection of a geometric surface at a proper distance from the display and sources. FIG. 4A illustrates two objects, (square object 52 and triangle object 54), in space at different distances from the two sensors, Sensor A and Sensor B. The sensors are slightly "towed in" relative to each other in order to create an increased overlap of the sensors' fields of view. (This is typically done with the sensors 12 of the system for this reason.) For accurate mapping of the two objects, a mapping surface should be chosen so that the two objects will appear appropriately to the observer. FIGS. 4B–4D illustrate the issues involved with choosing the location of the mapping surface.

Specifically, FIGS. 4B and 4D illustrate the problems associated with locating the surface 60 at the location of the square object 52. In this instance, after the surface is chosen, the square object 52 is projected onto the same location of the surface 60 for each sensor. For Sensor A, the triangle object maps to position 56a, while for the Sensor B, the triangle object maps to surface at position 56b. As illustrated in FIG. 4D, when the images from the two sensors are combined, it will appear to the observer that there are two triangles in the field of view.

With reference to FIGS. 4B and 4C, in a similar manner, if the surface 60 is selected at the position of the triangle object 54, the triangle object 54 will be mapped to the same location of the surface 60 for each sensor. For Sensor A, the square object maps to position 58a, while for the Sensor B, the square object maps to surface at position 58b. As illustrated in FIG. 4C, in this instance, when the tile images from the two views are combined, it will appear as though there are two squares in the field of view.

As illustrated in FIGS. 4A–4D, the selection of the position of geometric mapping surface is a critical issue in reducing parallax anomalies. For example, in the case illustrated in FIGS. 4A–4D, the appropriate mapping surface location is theoretically indeterminate for objects at different ranges along the same ray. In other words, the location of a mapping surface is a function of the relative 3D geometry expressed from the viewpoint perspective, which is discontinuous at best, and indeterminate at worst. This is why the surface is chosen to approximate the geometry being imaged in order to obtain a solution that minimizes the parallax anomalies.

In the case of an aircraft a sphere may be used as the geometric mapping surface. At a significant altitude, parallax anomalies tend toward zero, allowing the geometric mapping surface to be chosen at some theoretical maximum distance. However, as the aircraft descends and approaches the ground, the distance between the aircraft location and the geometric mapping surface must be decreased to more closely approximate the distance between the aircraft and surrounding objects, such as the terrain. Thus, for low altitude flight, landing, and taxiing or in the case of ground vehicles or ground applications, a flat geometric surface may be used either with or as opposed to a sphere to approximate the surface of the ground. Other geometric shapes are contemplated.

For example, some synthetic navigation data include terrain data that is represented in 3D by using polygons to represent various terrain features. The polygons could be used for mapping surfaces. In this instance, the system would include various geometric surfaces, and the surface that is closest to a display would be used as the mapping surface. As the aircraft moves, the geometric mapping surface would change to the then closest geometric surface from the synthetic data. In another example, the system could receive data from a ranging device that indicates a range to terrain and other features. This range data can be used to construct the geometric mapping surface.

In addition to selecting a geometric mapping surface, it is also important to create a common or primary coordinate system for transforming between the coordinates systems of the sources and the display. FIG. 5 illustrates a spherical geometric mapping surface 60 that has been selected relative to a source 61 and an object 62, with the object projected onto the surface at 62'. As can be seen in this figure, the source 61 has a coordinate system 64, the display has a coordinate system 66, and the mapping surface has a coordinate system 68 that are all different from each other. The object is to create a primary coordinate system that allows for mapping between the vector spaces of the source 61 and the display.

In one embodiment of the present invention, the primary coordinate system is chosen as that of the mapping surface, which, in turn, typically corresponds to the coordinate system of the vehicle. It is important to account for as many factors as possible to ensure an accurate transformation is performed. Specifically, each source and display is modeled as a full six-degree-of-freedom component to account for x, y, and z position, as well as pitch, roll, and yaw. Further, the optics associated with each sensor also affects the perspective of the image received by the sensor, and there also may be distortions caused by displaying the image on the raster of the display. In light of this, the transformations include modeling each sensor and display in the system as full six-degree-of-freedom component with non-linear transformations for differences in optics and display on a raster. Because the optics and raster transformations are used to determine the pixel line of sight vector in their proper coordinate systems, these calculations need only be calculated at initialization. The transformations for the sources and display are used to properly correlate corresponding pixels of the display and sources, so that the images can be properly aligned and displayed.

FIGS. 6–8 demonstrate the operation of the systems and methods of the present invention. FIG. 6 illustrates a display 28 and at least two sources, 61a and 61b. A common mapping surface 60 is defined at a distance in front of the display and sources. An object 62 is located outside of the mapping surface at some unknown distance, but is mapped to the mapping surface to thereby provide a reference for correlating pixels from the display and sensors to each other. The display 28 has a field of view 70 defined by its pixels that project onto the mapping surface. The display's field of view changes as the pilots or user move their head relative to the object 62. As such, the location that the field of view of the display intersects on the mapping surface changes as the pilot changes his or her line of sight.

The sources, 61a and 61b, also have respective fields of view that project onto the mapping surface. The coordinate system of the mapping surface is the primary coordinate system, which is typically the same as the aircraft in this example. As the sources are attached to the aircraft, their position relative to the aircraft, and thus, its coordinate system will remain the same. FIG. 6 represents an instance in time for a particular line of sight of the pilot and line of sight of each source relative to the object 62.

For example purposes, two pixels of the display are chosen to illustrate the operation of the invention. Each pixel has a line of sight vector, respectively 72 and 74, that extend to the mapping surface at locations, 72a and 74a respectively. As illustrated, the intersection 72a of the first vector 72 on the mapping surface is within the field of view of the source 61a, while the intersection 74a of the second vector 74 is at a location on the mapping surface within the field of view of both of the sources. For the display pixel associated with the first line of sight vector 72, the systems and methods of the present invention will determine which pixel or pixels of the source 61a corresponds to the display pixel. However, for the display pixel associated with the second line of sight vector 74, the systems and methods will determine which pixels from both sources correspond to the display pixel. In this instance, the systems and methods will stitch or fuse the values for the respective pixels of the two sources together to provide a value for display. If the sources are of the same type, (i.e., two CCD cameras), then the systems and methods will use a stitching or blending process. If the sources are of a different type, (i.e., a CCD camera and an infrared sensor), then the systems and methods will use a fusion process.

Provided below is an explanation of the operations performed for each display pixel to determine what data is displayed for the pixel. Following this description are examples of the operations for the first and second pixels of the display in FIG. 6.

FIG. 7 is a block diagram corresponding to FIG. 3. FIG. 7 illustrates graphically the operations performed to generate a display based on images from source inputs. FIG. 8 is a flow chart illustrating in greater detail the operations of the systems and methods of the present invention.

As illustrated in FIG. 7, the high-speed RAM 44 comprises the precalculated values used by the FPGA. Four each source and display, the following values are stored: (Unless otherwise stated, the values are represented in the coordinate system of the respective source/display, which is the proper coordinate system for nonscalar quantities.)

1. Each line of sight vector for each pixel of the display or source.
2. The horizontal and vertical pixel resolution.
3. The horizontal and vertical field of view.
4. The offset vector, in primary coordinates, from the origin of the primary coordinate system to the origin of the respective source/display coordinate system. This offset is the physical distance and direction of the display or source from the origin of the primary coordinate system, (i.e., the location of the source or sensor relative to the zero origin (0,0,0) of the aircraft.
5. The appropriate primary-to-source or display-to-primary transformation for the given display or source. In addition to the information stored for each display or source, the RAM also stores the mapping surface parameters.

Of these stored values, only the display-to-primary transformation need be continuously updated. To properly account for the pilot's line of sight changes as he moves his head. The transformation consists of a 3×3 rotation matrix and an offset vector associated with the offset distance and direction of the display from the primary coordinate origin (0,0,0). As illustrated in FIG. 7, this calculation is typically handled by the central processor 36, which can easily calculate the transformation from head tracker data at a rate much faster than a required display frame rate. The mapping surface parameters may be periodically updated by either the pilot or automatically from instrument readings. With regard to all constant intermediate values, these are calculated once at system initialization to avoid redundancy. The central processor may also adjust gain setting on the sensors and handle pilot requested zoom and pan functions.

With reference to FIG. 8, the following data and parameters are initially input to the system: line of sight data for each pixel of the display; line of sight data for each pixel of each source; the transformation for transforming the display coordinates to the primary coordinates; and the mapping surface parameters. (See input block 100). On a continuous basis, the central processor 36 determines the current line of sight provides it to the FPGA. The central processor also adjusts sensor gains and other preliminary calculations. (See block 110).

For each display pixel, (see block 120), the FPGA 38 transforms the line of sight associated with the pixel to the primary coordinate system using a simple 3×3 matrix rotation plus an offset. (See block 130).

The FPGA then extends the line of sight of the display pixel until it intercepts the mapping surface. (See block 140). This is a simple quadratic calculation for a sphere, and a simpler linear calculation for a plane. Other common geometric surfaces also have simple analytical solutions that the algorithm can easily accommodate. If multiple surfaces are present, the intercept closer to the display is the one seen. As far as the algorithm is concerned, the object viewed by the display pixel is on a mapping surface at the calculated intercept point.

After the FPGA has determined the location on the mapping surface that corresponds to the display pixel, the FPGA next determines what pixels of what sources correspond to the display pixel. For each active source, the following operations are performed:

1. A vector from the source origin to the mapping intercept where the display pixel vector intersects with the mapping surface is calculated in the primary coordinate system. (See block 150).

2. The calculated vector is then transformed into the coordinate system of the source.

3. Using a simple pinhole optics model, the source pixel grid coordinates that should correspond to this calculated line of sight vector are calculated. This is compared to the actual line of sight vector for these coordinates, which can easily be interpolated from the source line of sight vectors stored in memory. The comparison yields a line of sight vector error. If the line of sight error is small, as it will be if the source can be accurately represented by pinhole optics, the source pixel grid coordinates corresponding to the display pixel have been found. Otherwise, an iterative solver is used to reduce the line of sight error vector and thus find the source pixel grid coordinates. The number of iterations required will depend on the complexity of the optical distortion, but it is unlikely that more than two iterations beyond the original estimate will be required for any reasonable level of distortion. (See block 160).

The present invention can use nearest neighbor, bilinear or bicubic interpolation of the source pixels.

4. With the source pixel grid coordinate corresponding to the display pixel now in hand, an unnormalized blending coefficient is calculated. (See block 170). This coefficient is used for stitching and/or fusing. Specifically, if one or more sources have fields of view that overlap in the area where the display pixel is located on the mapping surface, then both will have pixels that correspond to the display pixel. The unnormalized blending coefficient provides a value for each source pixel indicating the percentage at which the source pixel should be displayed relative to the pixels of the other sources that also correspond to the same display pixel. This allows two or more source pixels to be stitched together.

The unnormalized blending coefficient is a value that is based on where the source pixel is located in the field of view of the source. If the pixel is located near the center of the field of view of the source, the unnormalized blending coefficient will approach one (1). Pixels located further from the center have values approaching zero (0).

The unnormalized blending coefficient in one embodiment is calculated as follows. Let x be the number of columns of the source pixel grid coordinates from the nearest corner; x need not be an integer, is zero if the source pixel grid coordinates lie outside the source field of view, positive otherwise, and is equal to one (1) if the source grid coordinate exactly corresponds to a corner pixel. Similarly, let y be the number of columns of the source pixel grid coordinate from the nearest corner. If Nx is the horizontal source resolution and Ny is the vertical source resolution, the unnormalized blending coefficient is (4*x*y)/(Nx*Ny). This value is zero outside the field of view, small near the edges, very small near the corner, and is unity at the center of the field of view.

5. For stitching, the source unnormalized blending coefficients for the display pixel are normalized by dividing each by the sum total. (See block 180). The unnormalized blending coefficient calculation was designed so that this simple normalization will properly account for the relative overlap, whether large or small. Testing has shown that it even works well when the sensors overlap at oblique angles, which should not occur in practice.

For fusion, the source unnormalized blending coefficients for the display pixel are normalized in a more complex fashion that varies widely depending on the nature of the sources and the type of fusion desired. However, in all cases the gist of the procedure is that a correspondence is established between the output spaces of the respective sources and the blending coefficients are normalized with respect to this correspondence to achieve, for example, percentage-based or content-based fusion.

With the display-to-source pixel correspondences and blending coefficients now calculated, the proper mix of source pixels can now be calculated for every display pixel.

As an example of the operation of the present invention, provided below is a brief explanation of the steps for determining the displays values for the display pixels, 72 and 74. With regard to FIG. 6, the line of sight for the first display pixel 72 is transformed to primary coordinate system. (See block 130). The display pixel line of sight 72 is then extended to find the mapping surface intercept 72a. Since there is only one source 61a that has a field of view corresponding to the point on the mapping surface where the vector 72 intersects the mapping surface, only this source will obtain a nonzero blending coefficient. Specifically, the vector 73 from the source origin to the mapping intercept is calculated in primary coordinates. The source vector 73 is then transformed from the primary coordinate system to the source coordinate system, and the source pixel grid coordinates that should correspond to this line of sight vector are calculated. This is compared to the actual line of sight vector for these source pixels, which provides a line of sight vector error. If the error is minimal, then the source pixels have been located. Otherwise an iterative procedure is used to find the correct source pixels. (See block 160).

After the source pixels are located, an unnormalized blending coefficient is determined for the source pixels based on the pixels location within the field of view of the source. (See block 170). In the instant case, because only one source 61a has pixels that correspond to the display pixel, the normalization step yields the full value for the source pixel. The unnormalized blending coefficient is divided by the sum total of unnormalized blending coefficients, which in this case equals one (1). These determined source pixels are then displayed in the display at the display pixel location.

The determination of display data for the second display pixel 74 is somewhat different. In this instance, both sources, 61a and 61b, have fields of view that overlap the location where the vector of the pixel 74 intersects the mapping surface. Each source has a pixel or group of pixels having respective lines of sight that correspond to the location on the mapping surface where the display pixel vector 74 intercepts the mapping surface at location 74a. Source 61a has a line of sight vector 73, and source 61b has a line of sight vector 77. In this case, the above steps are repeated for both sources. Importantly, the source pixels for each source that correspond to the display pixel are properly weighted based on their respective particular pixel location in the field of view of their respective source. In the normalizing operation, (see block 180), the data to be displayed for the display pixel 74 is determined by dividing the unnormalized blending coefficient for each source pixels by the total of the unnormalized blending coefficients for each source. In this manner, the display data from each source is blended or stitched together to provide a seamless display.

As mentioned, in situations where sensors have overlapping fields of view, the pixels for each source in the overlap region are stitched or blended together through a weighting process. (See block 170, FIG. 8). This stitching minimizes, if not eliminates a visual seam in the display. For example, FIG. 9 illustrates a series of image tiles 76a–76d provided by sources that are adjacent to each other and have overlapping fields of view. When these images are processed, they are stitched together into a composite image 78. The images overlap in the blend zones 80. Due to the normalization blending of corresponding pixels from each source in the blend zones, the composite image will appear seamless.

In addition to providing methods for blending of adjacent tiles, the present invention also provides methods for fusing or overlaying two image tiles of a same field of view taken by different types of sensors. Fusion of two images allows the user to view a composite image that includes the advantages offered by both sensors. An example is fusion of images from a video camera and an infrared sensor, where the fused image benefits from visual characteristics of the camera and heat visualization of the infrared sensor.

FIG. 10 is graphic illustration of fusion. As illustrated, each sensor captures a respective image, 82a and 82b. The systems and methods of the present invention process the two images on a pixel by pixel basis to create a composite image 84 having individual pixels that are defined as a percentage of the two corresponding pixels of the two images, 82a and 82b. Fusion is performed by the FPGA 38 in the normalizing operation. (See block 180, FIG. 8).

Because the sources are different types of devices, there may be several differences between the images that must be adjusted prior to combining the images. For example, the sensors may have different pixel value scales, one source may be linear while the other is non-linear, one may be black and white while the other is in color, etc. In light of this, either the FPGA or the central processor adjusts the images relative to each other so that they have common parameters.

Following adjustment of the parameters of the two images, the systems and methods of the present invention provide alternative methods for fusing the two images. For example, to accentuate one image or the other, the central processor can weight the value of the pixels of one of the images relative to the other image. For example, in a percentage based method, the systems and methods of the present invention may weight one image to have a first value that is for example 30% and weight pixels in the other image by 70% to thereby accentuate the second image. As an example, FIG. 11 illustrates fusion 88 of long-wave infrared image 86a with a CCD camera image 86b, each contributing 50%.

As an alternative to percentage-based fusion, content-based fusion may be used. This method involves a similar percentage ratio blending, however, rather than applying the same percentage weight to all pixels of an image, the blending coefficient is determined from the incoming pixel intensity. This is referred to as a pixel driven fusion. If the pixel of one image has a greater intensity than that of the pixel of the other image, then the pixel will with the greater intensity will be weighted greater. This, in turn, causes the pixels with the greater intensity to be displayed more prominently, regardless of which image the pixel corresponds.

For example, given a visible and an infrared image covering similar fields of view, the images can be combined at pixel level, where priority can be given to the infrared image based upon its pixel intensity. In this case, if the infrared pixel is at 75% of maximum, then the resulting pixel would be composed from 75% of the IR pixel intensity and 25% visible pixel intensity.

FIG. 12 illustrates an infrared image 90a and a CCD camera image 90b fused together, where the infrared image is displayed in red and the CCD image is displayed in green. This emphasizes the spectral content of each source image. For example, the glint on the car hood 92 and the telephone pole 94 are emphasized by the infrared image.

Other fusion techniques are contemplated for use with the present invention. These include, for example, arithmetic operations, frequency domain manipulation, and object identification and extraction.

As illustrated in FIG. 7, the central processor can control the gains on individual sensors. If the gains of the sensors are not properly controlled, areas of the image displayed to the user may have bright spots that distract the viewer. For example, if two sensors are adjacent to one and one has a different gain, when their representative images are stitched together, one image may be brighter than the other. This problem can be solved either by having the central processor adjust the gain for one of the sensors or the data from a sensor having a higher gain can be weighted negatively so as to display adjacent images have similar gains. For example, as shown in FIG. 13, when two images are stitched together at a seam 96, a difference in brightness 98 between the images may occur. To remedy this, the intensity magnitudes for the brighter image may be scaled down, resulting in a more pleasing brightness match 100.

Gain issues may not be limited to differences between two images; there may also be gain differences between different sensors in a source. These differences may cause bright spots to appear in the display. To remedy these gain anomalies, the systems and methods of the present invention can adjust these pixel gains by performing intensity integration over a group of pixels. In this instance, the systems and methods select a reference pixel having a desired intensity and then calculate a mean intensity to be used to adjust the intensity of the pixels that have higher intensity values.

In addition to the mosaic image stitching and image fusion, the systems and methods of the present invention also provide the ability to present picture-in-picture virtual displays distributed throughout the viewable space. For instance, it may be desirable to have a moving map presented in the lower display areas, similar to having a paper map in your lap. Another desire might be to have a rear-facing camera mapped to a tile in the upper display area, similar to a rear-view mirror. These concepts are depicted in FIG. 14, which shows an image display 102 along the pilot's line of sight, a rear-view mirror tile 104 above, and a moving map tile 106 below. This imagery can be further augmented with a synthetic image source, such as a head-tracked 3D terrain rendering correlated with vehicle position.

In this instance, the central processor receives the terrain data from the navigation database. The terrain data is treated similar to the images from the other sources. Specifically, the terrain data is processed pixel by pixel to ascertain which pixel of the data corresponds to a give display pixel. Because the synthetic data is treated the same other types of source data, the synthetic data can be combined with other types of data. For example, the synthetic data can be displayed either in its own tile as is shown in FIG. 14 or it may be meshed or fused with the images from the sensors. For example, FIG. 15 illustrates a synthetic image fused with an image from a sensor. In addition to moving map data other types of display data could also be displayed in a separate tile or fused with the images. For example, the aircrafts HSI and ADI displays, altimeters, airspeed, etc. could be displayed on the display as a tile or fused with an image to provide an integrated view allowing the pilot to view instrument readings while also viewing the environment surrounding the aircraft.

While not illustrated, the systems and methods also include the ability to provide picture-in-picture tiling, zooming, panning etc.

U.S. patent application Ser. No. 10/379,409 entitled: SYSTEMS AND METHODS FOR PROVIDING ENHANCED VISION IMAGING, and filed concurrently herewith describes another image display system; the contents of which are incorporated herein by reference.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for providing vision imaging comprising:
at least one display having a plurality of pixels for displaying images provided by said image source, wherein at least one image source pixel of said image source corresponds to a pixel of said display, said display further having a display coordinate system;
at least two image sources each having image source pixels that correspond to a pixel of said display, wherein the image source pixel from each image source has a unique characteristic,
a serial processing element in communication with said display, said serial processing element capable of calculating transformations for said display that relate the coordinates of said display to a primary coordinate system; and
a parallel processing element, in electrical communication with said serial processing element and said display, said parallel processing element capable of receiving image data from the image source and using the transformations calculated by said serial processing element for said display to transform the image source pixel corresponding to the display pixel into the display coordinate system for display at the display pixel location,
said parallel processing element determines which image source pixels of said image sources correspond to said display pixel, and wherein said parallel processing element combines the image source pixels of each image source together into a resultant pixel containing the unique characteristic of each image source pixel.

2. A method for providing vision imaging comprising:
providing at least one display having a plurality of display pixels, wherein the display has a display coordinate system;
providing at least two image sources each having a plurality of image source pixels, the image sources each providing images from a field of view for display on the display;
defining a mapping surface at a distance from the display and the image sources such that pixels of the display and image source have respective line of sights that intercept the mapping surface;
determining for a given display pixel which of the image source pixels correspond to a location where the line of sight of the display pixel intercepts the mapping surface, wherein said determining step comprises:
calculating transformations for the display that relate the coordinates of the display to a primary coordinate system;
receiving image data from the image source; and
transforming the image source pixel to the display coordinate system using the transformations to thereby display the image source pixel at the display pixel location,
wherein the at least two image sources each have pixels that correspond to a pixel of the display, and for each image source said determining step determines which pixels of the image source correspond to the display pixel and combines the pixels of each image source together to form data for displaying at the display pixel.

3. A method according to claim 2, wherein said determining step weights each image source pixel of each image source that corresponds to the display pixel based on a location of the image source pixels within the field of view of its respective image source and sums the image source pixels of each image source together based on their associated weights.

4. A method for providing vision imaging comprising:
providing at least one display having a plurality of display pixels, wherein the display has a display coordinate system;
providing at least one image source having a plurality of image source pixels, the image source providing images from a field of view for display on the display;
defining a mapping surface at a distance from the display and the image source such that pixels of the display and image source have respective line of sights that intercept the mapping surface,
determining for a given display pixel which of the image source pixels correspond to a location where the line of sight of the display pixel intercepts the mapping surface, wherein said determining step comprises:
calculating transformations for the display that relate the coordinates of the display to a primary coordinate system;

receiving image data from the image source; and transforming the image source pixel to the display coordinate system using the transformations to thereby display the image source pixel at the display pixel location, wherein the image source has an image source coordinate system and wherein said calculating step calculates transformations for the image source that relate the coordinates of the image source to a primary coordinate system, wherein for each display pixel said determining step:

extends a first vector from the display pixel to a mapping surface;

determines a point where the vector intercepts the mapping surface;

extends a second vector from the image source to the intercept;

transforms the second vector to the coordinate system of the image source; and determines which pixels of the image source correspond to the transformed second vector.

5. A method according to claim 4, wherein in said determining step if the transformed second vector does not correspond to specific pixels of the image source, said determining determines pixels of the image source that have an associated vector extending to the mapping surface that approximates the second transformed vector.

6. A method according to claim 4, wherein in said determining step if the transformed second vector does not correspond to specific pixels of the image source, said determining step further:

determines potential pixels of said image source that should correspond to the transformed second vector; and for each potential pixel:

extends a third vector from the potential pixels to the mapping surface; and compares the third vector to the transformed second vector to determine a line of sight vector error; and selects the pixels having the lowest line of sight vector error.

7. A method for providing vision imaging comprising:

providing at least one display having a plurality of display pixels, wherein the display has a display coordinate system;

providing at least two image sources each having a plurality of image source pixels, the image sources each providing images from a field of view for display on the display;

defining a mapping surface at a distance from the display and the image source such that pixels of the display and image source have respective line of sights that intercept the mapping surface;

determining for a given display pixel which of the image source pixels correspond to a location where the line of sight of the display pixel intercepts the mapping surface, wherein said determining step comprises:

calculating transformations for the display that relate the coordinates of the display to a primary coordinate system;

receiving image data from the image source; and transforming the image source pixel to the display coordinate system using the transformations to thereby display the image source pixel at the display pixel location, wherein the at least two image sources each have image source pixels that correspond to a pixel of the display, wherein the image source pixel from each image source has a unique characteristic, said determining step determines which image source pixels of the image sources correspond to the display pixel and combines the image source pixels of each image source together into a resultant pixel containing the unique characteristic of each image source pixel.

8. A system for providing vision imaging comprising:

at least one image source having a plurality of pixels, wherein said image source has an associated image source coordinate system;

at least one display having a plurality of pixels for displaying images provided by said image source, wherein at least one image source pixel of said image source corresponds to a pixel of said display, said display further having a display coordinate system;

an image processor in communication with said display, said image processor capable of:

calculating transformations for said display that relate the coordinates of said display to a primary coordinate system and transformations for said image source that relate the coordinates of said image source to the primary coordinate system;

receiving image data from the image source; and transforming the image source pixel corresponding to the display pixel into the display coordinate system for display at the display pixel location using the calculated transformations, said transforming comprising:

extending a first vector from said display pixel to a mapping surface;

determining a point where the first vector intercepts the mapping surface;

extending a second vector from said image source to the intercept;

transforming the second vector to the coordinate system of said image source; and determining which pixels of said image source correspond to the transformed second vector.

9. A system according to claim 8, wherein if the transformed second vector does not correspond to specific pixels of said image source, said image processor determines pixels of said image source that have an associated vector extending to the mapping surface that approximates the second transformed vector.

10. A system according to claim 8, wherein if the transformed second vector does not correspond to specific pixels of said image source, said image processor further:

determines potential pixels of said image source that should correspond to the transformed second vector; and for each potential pixel:

extends a third vector from the potential pixels to the mapping surface;

compares the third vector to the transformed second vector to determine a line of sight vector error; and selects the pixels having the least line of sight vector error.

11. A system for providing vision imaging comprising:

at least two image sources each having a plurality of pixels;

at least one display having a plurality of pixels for displaying images provided by said image sources, wherein at least one image source pixel of each of said image sources corresponds to a pixel of said display, said display further having a display coordinate system;

an image processor in communication with said display, said image processor capable of:

calculating transformations for said display that relate the coordinates of said display to a primary coordinate system;

receiving image data from the image sources; and transforming the image source pixels corresponding to the display pixel into the display coordinate system for display at the display pixel location using the calculated transformations, wherein when said at least two image sources each have pixels that correspond to a pixel of said display, for each image source said image processor is capable of:

determining which pixels of said image sources correspond to said display pixel; and combining the pixels of each image source together to form data for displaying at said display pixel.

12. A system according to claim 11, wherein said image processor weights each image source pixel of each image source that corresponds to the display pixel based on a location of the image source pixels within the field of view of its respective image source and sums the image source pixels of each image source together based on their associated weights.

13. A system according to claim 11, wherein at least two image sources each have image source pixels that correspond to a pixel of said display, wherein the image source pixel from each image source has a unique characteristic, said image processor determines which image source pixels of said image sources correspond to said display pixel, and wherein said image processor combines the image source pixels of each image source together into a resultant pixel containing the unique characteristic of each image source pixel.

14. A system for providing vision imaging comprising:

at least two image sources each having image source pixels that correspond to a pixel of said display, wherein the image source pixel from each image source has a unique characteristic;

at least one display having a plurality of pixels for displaying images provided by said image sources, wherein at least one image source pixel of each of said image sources corresponds to a pixel of said display, said display further having a display coordinate system;

an image processor in communication with said display, said image processor being capable of:

calculating transformations for said display that relate the coordinates of said display to a primary coordinate system and transformations for said image sources that relate the coordinates of said image sources to the primary coordinate system;

receiving image data from the image sources; and transforming the image source pixels corresponding to the display pixel into the display coordinate system for display at the display pixel location using the calculated transformations, said image processor further being capable of:

determining which image source pixels of said image sources correspond to said display pixel; and combining the image source pixels of each image source together into a resultant pixel containing the unique characteristic of each image source pixel.

* * * * *